United States Patent

McKay

[15] 3,634,950

[45] Jan. 18, 1972

[54] ELECTRICAL ARRANGEMENT FOR USE IN TEACHING MACHINE

[72] Inventor: Ian Guy McKay, Hardingstone, Northampton, England

[73] Assignee: Kee, Inc., Baltimore, Md.

[22] Filed: Nov. 20, 1969

[21] Appl. No.: 878,456

[30] Foreign Application Priority Data

Nov. 20, 1968 Great Britain......................55,159/68

[52] U.S. Cl. ..............................................35/5, 35/9 B, 35/48 R
[51] Int. Cl. ..............................................................G09b 7/00
[58] Field of Search ................................................. 35/9, 48

[56] References Cited

UNITED STATES PATENTS

| 2,857,100 | 10/1958 | Franck et al. | 35/5 X |
|---|---|---|---|
| 3,121,959 | 2/1964 | Uttal | 35/9 |
| 3,360,873 | 1/1968 | Tillotson et al. | 35/9 |

FOREIGN PATENTS OR APPLICATIONS

| 1,116,812 | 6/1968 | Great Britain | 35/5 |
|---|---|---|---|
| 1,170,446 | 11/1969 | Great Britain | 35/5 |

Primary Examiner—Robert W. Michell
Assistant Examiner—J. H. Wolff
Attorney—Shlesinger, Arkwright & Garvey

[57] ABSTRACT

An electrical circuit arrangement for use in a teaching machine which has a keyboard unit to be operated by a student. A control signal in the circuit arrangement is either blocked or allowed to pass by a gate according to the condition of a comparator in which signals derived from switches representative of a keyboard and a store are compared.

7 Claims, 3 Drawing Figures

ELECTRICAL ARRANGEMENT FOR USE IN TEACHING MACHINE

This invention relates to an electrical circuit arrangement for use in a teaching machine which has a keyboard unit to be operated by a student.

Teaching machines are known having a keyboard with keys representing characters which keys are mechanically linked via cams to micro switches, a store containing discrete elements of information representing characters arranged in a predetermined sequential manner, and a comparator to which signals from both the keyboard and the store may be fed simultaneously. A teaching machine of this type is described in the specification of British Pat. No. 1,116,812.

In the operation of such teaching machines the student reads a text consisting of characters which correspond to the characters stored in the store and then operates the keyboard in accordance with what is read to provide one set of signals to the comparator, it being arranged that a corresponding set of signals is fed from the store to the comparator in the predetermined sequential manner as each key is operated. The output from the comparator indicates whether or not there has been a correct operation of a key. Such an arrangement enables the student to be provided with a text which is in exactly the same form as would be employed in normal working conditions in such a way that the student may develop from the start the correct working rhythm and operating techniques, such as reading ahead of the character corresponding to the key being operated. Whilst this known teaching machine is satisfactory it has the disadvantage that a mechanically linked keyboard is required which means that for each new skill to be taught a relatively expensive keyboard has to be made.

According to the present invention there is provided a teaching machine comprising a keyboard with keys representing characters, a store which in use contains discrete elements of information representing characters arranged in a predetermined sequential manner, and a comparator connected to outputs of both the keyboard and the store, the control circuit connected to the output of the keyboard and which is arranged to produce a control signal when any of the character representing keys is actuated and a gate connected to both the comparator and the control circuit, whereby in one condition of the comparator the control signal is blocked by the gate, and in a second condition of the comparator the control signal is allowed to pass the gate.

An embodiment of the invention will now be described, by way of example, with reference to the accompanying drawings, in which.

Figure 1A:
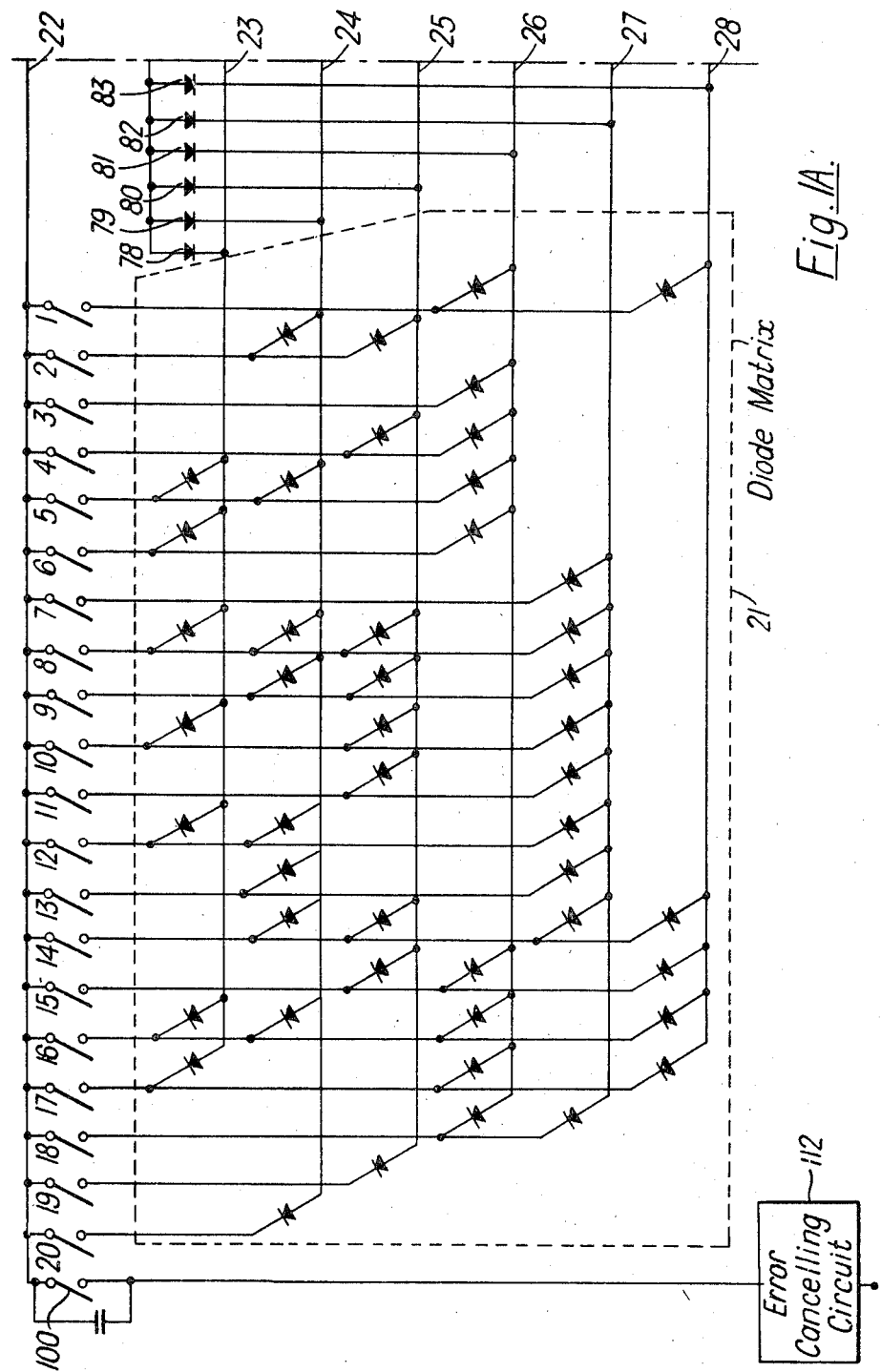
FIGS. 1A and 1B show a basic circuit arrangement employing a binary code.
Figure 1B:
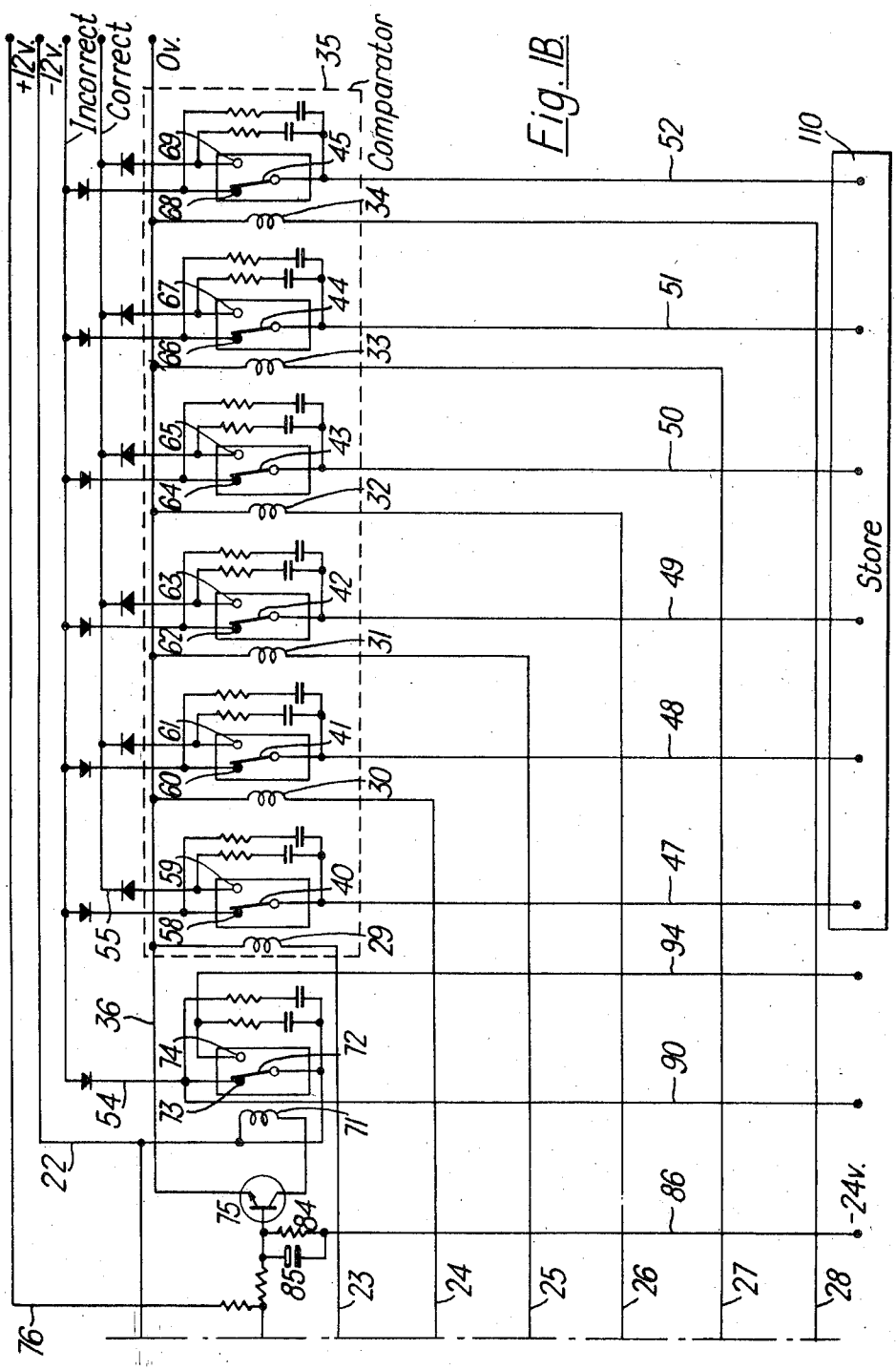

Referring to FIG. 1 there is shown a series of switches, for example reed switches numbered 1 to 20. Each of these switches is associated with a key of a keyboard (not shown). Each of the switches 1 to 20 is connected to a diode matrix within the dotted lines 21 in such a way that the operation of each one of the switches connects a potential of —12 volts from a line 22 to a predetermined combination of output leads 23 to 28. The leads 23 to 28 are connected to the operating coils 29 to 34 of a series of relays forming a comparator arrangement indicated within the dotted line 35. The other side of each of the relay coils is connected to a 0 volt line 36.

In the particular embodiment described the coils 29 to 34 are the operating coils of reed relays and each relay has a changeover switch associated with its coil. The changeover switches have tongues or moving contacts 40 to 45 each connected via a respective lead 47 to 52 to one element of a parallel output from a store, shown schematically at 110, provided by a punched tape reader. A comparison between the output from the punched tape reader 110 and the output from diode matrix 21 is made by reading the signals on a pair of leads 54 and 55 connected to the fixed contacts 58 to 69 of the relay switches. Movement of the tape through the punched tape reader successively energizes different groups of the leads 47 to 52.

In the operation of the apparatus it is arranged that a correct key operation shall be indicated by the presence of a signal on the lead 55 and the absence of a signal on the lead 54. If neither one of these conditions exists provision is made for an error in the operation of a key to be indicated. In the particular embodiment described this function is achieved by employing a gate controlled by the signals on the leads 54 and 55 so that a control signal sent after a predetermined time delay is either blocked or allowed to pass. The time delay is necessary to enable all the reed relays associated with a particular switch, which due to manufacturing tolerances are not identical, to be actuated so that a complete coding is made before the reading of the signal. If no time delay is used then there is a risk that only a part of the code will be read with the result that an error signal is indicated.

The control signal is transmitted from a further reed relay associated with the keyboard and having an operating coil 71 and a changeover switch including a moving contact 72 and fixed contacts 73 and 74. The coil 71 is connected between the 0 volt line 36 and the —12 volts line 22 via the emitter-collector circuit of a transistor 75. The base of the transistor 75 is connected to a 12 volts positive line 76 and, via isolating diodes 78 to 83, to the output leads 23 to 28 from the diode matrix 21. A time delay circuit consisting of a resistor 84 and a capacitor 85 is connected between the base of the transistor 75 and a 24 volts negative line 86. The fixed contact 73 of the signal relay is connected both to the line 54 and to a line 90. The fixed contact 74 is connected to a line 94 and the moving contact 72 is connected to the —12 volts line 22.

Figure 2:
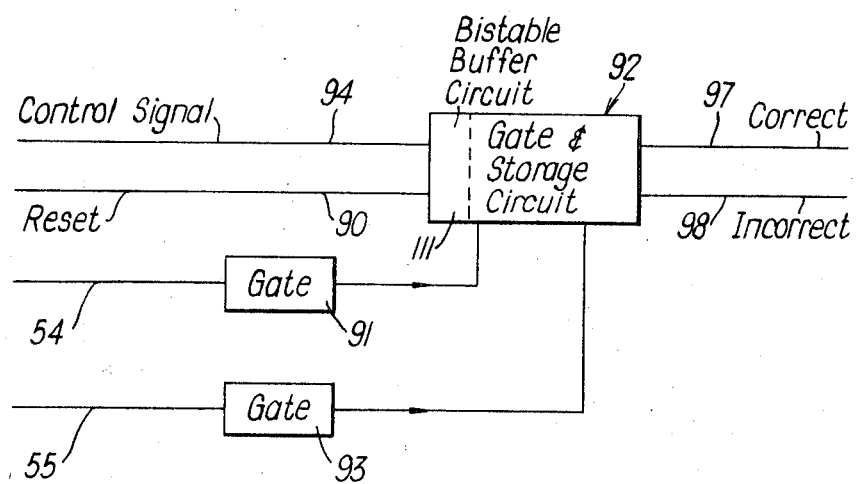
FIG. 2 shows a block schematic diagram of a coupling and gating circuit from the circuit of FIG. 1 to an indicator device.

Referring to FIG. 2 the line 54 is shown connected via a gate 91 to one input of a gate and storage circuit 92, and the line 55 is connected to a second input of the circuit 92 via a gate 93. A third input to the circuit 92 is also provided directly via the line 94 connected to the contact 74 of the signal relay. The circuit 92 has two outputs 97 and 98, the output 97 providing a signal when the correct key has been operated and the output 98 providing a signal if an error is detected. A further input to the circuit 92 is provided over the line 90. The input of the circuit 92 to which the lines 90 and 94 are connected includes a bistable buffer circuit shown schematically at 111, which isolates the remainder of the circuit 92 from interference from the reed relays and is reset by a signal on the line 90.

Considering the complete operation of the circuit let us assume a condition such that the code from the reader of the tape store requires that for a correct operation the The perforations contained on the punched tape are scanned by the tape reader, and in this instance, two output leads, connected to leads 48 and 49 would be activated. Thus there are signals on the moving contacts 41 and 42 and no signals either on the leads 47, 50, 51 and 52 or their associated moving contacts. Assume that the keyboard switch 2 is now correctly operated and that a connection has thereby been extended from the —12 volts line 22 to the leads 24 and 25 from the matrix 21 via two of the diodes in the matrix. The leads 24 and 25 provide a connection for this voltage to the coils 30 and 31 and thence to the zero volts line 36 causing the operation of the moving contacts 41 and 42. Since the key 2 has been operated in the correct sequence signals derived from the store will appear on the lead 55 via the moving contacts 41 and 42 while no signal will appear on the lead 54.

It may be noted that at the time that the —12 volts signal appeared on the leads 24 and 25 causing the operation of the coils 30 and 31 a signal was also applied to the diodes 79 and 80 and the delay circuit consisting of the resistor 84 and the capacitor 85. After a period of time determined by the time constant of the delay circuit the bias on the base of the transistor 75 is overcome and the transistor conducts enabling the coil 71 to operate and to move the contact 72 on to the fixed contact 74 and thereby to apply —12 volts from the line 22 to the line 94 and to disconnect this voltage from the line 90.

Since the conditions on the leads 54 and 55 are those corresponding with the correct operation of a key the gate circuit 92 in FIG. 2 is opened by signals from the gates 91 and 93 and the signal on the lead 94 is allowed to cause an output to appear on the lead 97. The signal on the lead 97 is used to advance the tape reader 110 by one place so that a new code is presented in the reader associated with the next group of leads 47 to 52 activated when the punched tape advances in the reader.

The tongue 72 of the signal relay puts a −12 volt signal on the lead 54 in its normal unoperated condition so that the gate 91 in FIG. 2 is held and is not affected by changes in the output from the comparator while it is being set up. As soon as the signal relay is operated the gate 91 is freed.

Where a key has been operated in the incorrect sequence a condition will arise in which either certain of the coils 29 to 34 will not be energized by the outputs from the diode matrix 21 and the tongues of the associated switches will have signals applied to them from the output of the tape store so that there will be a signal on the lead 54 or certain coils will be energized and there will be no signals on the associated tongues from the output of the tape store so that there will be no signal from these switches on the lead 55.

Thus an error condition may be indicated either by the appearance of a signal on the lead 54 or by the absence of a signal on the lead 55. Either of these signal conditions will result in the blocking of a signal output on the lead 97 from the circuit 92 when there is an input to the circuit on the lead 94, as a result of the blocking of at least one of the inputs to the circuit 92 by at least one of the gates 91 and 93. However, in either of these conditions it is arranged that there will be an error signal on the lead 98 from the circuit 92 after a predetermined time delay so that an indication may be given to the operator. The error signal on the lead 98 prevents the tape store 110 from being advanced. A key 100 is provided on the keyboard for use by the operator in cancelling the error indication by means of a circuit shown schematically at 112. Until an output signal is obtained on the lead 97 it is not possible for the tape store 110 to be advanced. Of course, it is possible that, due to the common connections between the lead 55 and the fixed contacts of the reed relays, there may be a signal on the lead 55 when there is an error in the operation of the key due to one element of the code set up by the relays coinciding with the particular element of the code read out from the store. However, in these cases the error will be indicated by an error reading on the lead 54.

The movement of the tongue 72 from the contact 73 to the contact 74 when an error condition is indicated, either by the absence of a signal on the lead 55 or the presence of a signal on the lead 54, thus results in no output signal on the lead 97 and an error indicating signal on the lead 98. Although the error condition might be read directly from the leads 54 and 55, the provision of the relay with the tongue 72 which is operated after a time delay ensures that all of the relays in the comparator 35 have operated before the signal conditions are read out. Since the relays in the comparator are only operated during the time that a key is operated by the operator and they are released when the key is released the time delay introduced by the delay circuit connected to the base of the transistor 75 is at least 100 milliseconds.

I claim:
1. A teaching machine comprising:
 a. a keyboard having a plurality of individual keys, each key having switch means associated therewith for connecting to a voltage source;
 b. a electrical matrix having input leads and output leads wherein one set of input leads is connected to each of said switches, and each of the input leads are connected in different combinations to at least one of the output leads of the matrix;
 c. a store of successive coded signals representing the keys on the keyboard and having a plurality of output leads equal to the number of output leads of the matrix which are successively actuated to correspond with the output leads of the matrix actuated when a given key of the keyboard is depressed;
 d. comparator means including separate switch means for each output lead of tee matrix and a corresponding output lead of the store, the switch means each having two output leads;
 e. a first output line of the comparator indicating that an incorrect key has been selected, to which one of the output leads of all of the switches are connected;
 f. a second output lead of the comparator for indicating that a correct key has been selected, to which the other output lead of each of the switches is connected.
2. The teaching machine as set forth in claim 1, wherein:
 a. gate means is connected to both the first and second outputs of the comparator for blocking an output from the gate in one condition, and passing a control signal therethrough for a second condition of the first and second output leads of the comparator.
3. A teaching machine as claimed in claim 2 in which the gate has two outputs, one of said outputs in use being connected to means for indicating that a correct key has been depressed and the other of said outputs being connected to means for indicating that an incorrect key has been depressed.
4. The teaching machine as set forth in claim 1, wherein:
 a. the switches of the comparator are reed relays having a coil and a changeover switch, including a single moving contact and first and second fixed contacts;
 b. a time delay circuit connected in series with the coil whereby energization of the coil causes the moving contact to shift from the first contact to the second contact.
5. A teaching machine as claimed in claim 4 in which the time delay circuit includes a transistor having base, emitter and collector electrodes, and in which each output lead from the matrix is connected via an isolating diode to the base electrode.
6. The teaching machine as set forth in claim 1, wherein:
 a. the matrix is a diode matrix.
7. A teaching machine as claimed in claim 6, in which each switch device is a reed relay having a coil and a changeover switch including a single-moving contact and first and second fixed contacts, the coil being connected to the output lead from the diode matrix and the moving contact being connected to the lead from the store, whereby energization of the coil causes the moving contact to shift from the first contact to the second contact during the time that the coil is energized.

* * * * *